United States Patent [19]

Bulman et al.

[11] Patent Number: 5,152,668

[45] Date of Patent: Oct. 6, 1992

[54] PITCH CHANGE MECHANISM FOR PROP FANS

[75] Inventors: David E. Bulman, Cincinnati; Petr Hora, West Chester; Thomas C. Hermans, Cincinnati, all of Ohio

[73] Assignee: General Electric Company, Cincinnati, Ohio

[21] Appl. No.: 556,155

[22] Filed: Jul. 23, 1990

[51] Int. Cl.⁵ .................. B64C 11/32; B64C 11/48
[52] U.S. Cl. ................... 416/129; 416/130; 416/160; 416/204 R
[58] Field of Search ............. 416/121, 128, 129, 130, 416/149, 150, 160, 162, 170 R, 204 R, 204 A; 475/331, 346

[56] References Cited

U.S. PATENT DOCUMENTS

| | | |
|---|---|---|
| 2,541,636 | 2/1951 | Chillson . |
| 2,664,960 | 1/1954 | Longfellow . |
| 3,536,415 | 10/1970 | Kusiak . |
| 3,647,320 | 3/1972 | Chilman . |
| 3,663,119 | 5/1972 | Brooking et al. ............... 416/160 |
| 3,672,788 | 6/1972 | Ellinger . |
| 3,687,569 | 8/1972 | Klompas ............... 416/160 |
| 3,866,415 | 2/1975 | Ciokajlo . |
| 3,893,789 | 7/1975 | Andrews . |
| 3,910,721 | 10/1975 | McMurtry . |
| 3,912,418 | 10/1975 | Andrews et al. . |
| 3,922,852 | 12/1975 | Drabek . |
| 3,964,839 | 6/1976 | Kusiak . |
| 3,994,128 | 11/1976 | Griswold, Jr. . |
| 4,047,842 | 9/1977 | Avena et al. . |
| 4,521,158 | 6/1985 | Fickelscher . |
| 4,534,524 | 8/1985 | Aldrich . |
| 4,657,484 | 4/1987 | Wakeman et al. . |
| 4,660,437 | 4/1987 | Scott . |
| 4,738,590 | 4/1988 | Butler . |
| 4,738,591 | 4/1988 | Butler . |
| 4,750,862 | 6/1988 | Barnes et al. . |
| 4,968,217 | 11/1990 | Newton ............... 416/160 |

FOREIGN PATENT DOCUMENTS

| | | |
|---|---|---|
| 58-197499 | 11/1983 | Japan . |
| 531756 | 1/1941 | United Kingdom . |
| 1296063 | 11/1972 | United Kingdom . |
| 2182397 | 5/1987 | United Kingdom . |

OTHER PUBLICATIONS

Article—"A New Design for a Contra-Prop"—Aeronautical Engineering.

Primary Examiner—Edward K. Look
Assistant Examiner—James A. Larson
Attorney, Agent, or Firm—Jerome C. Squillaro; John R. Rafter

[57] ABSTRACT

The invention relates to pitch-change systems in aircraft propellers. The invention includes redundant planetary gear systems, each of which can independently change pitch if the other fails. The invention also includes a system for reducing displacement of the planets, which can occur during a failure.

16 Claims, 11 Drawing Sheets

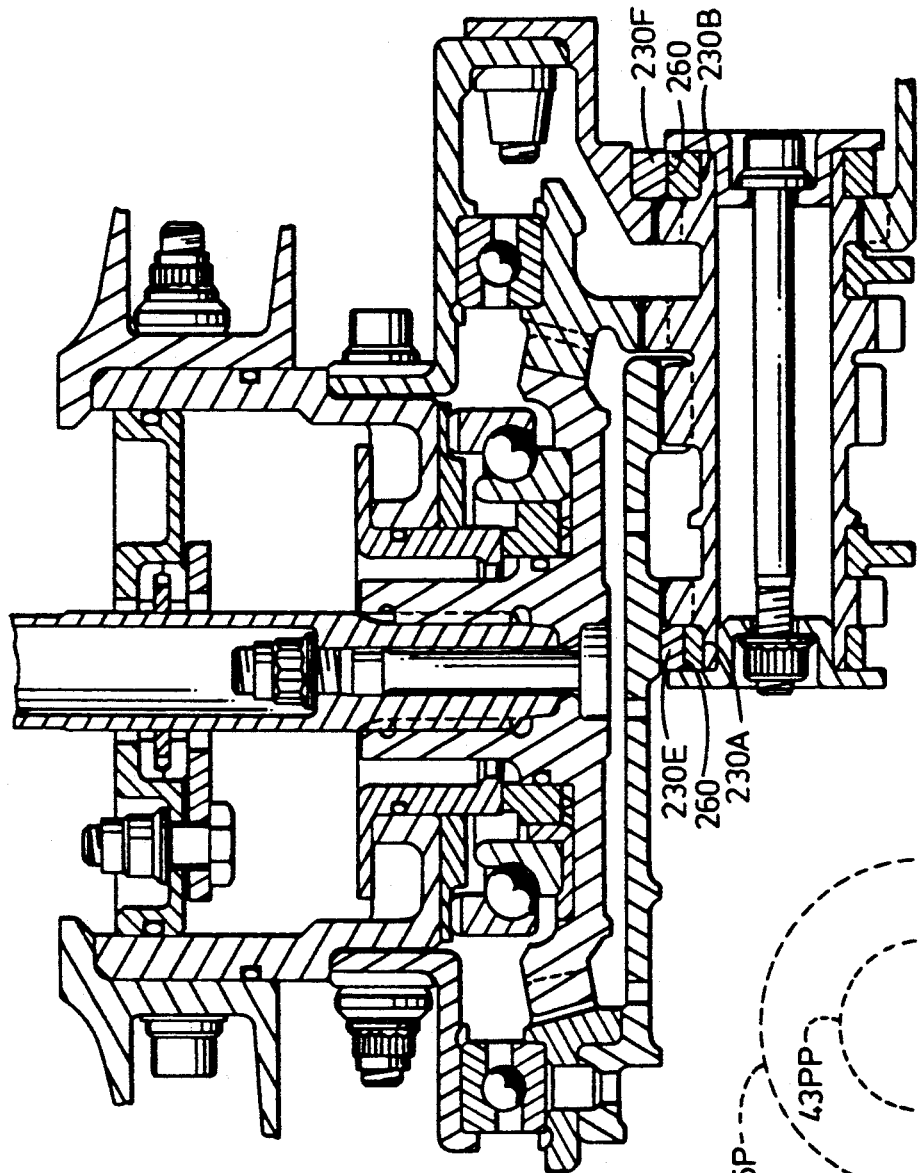
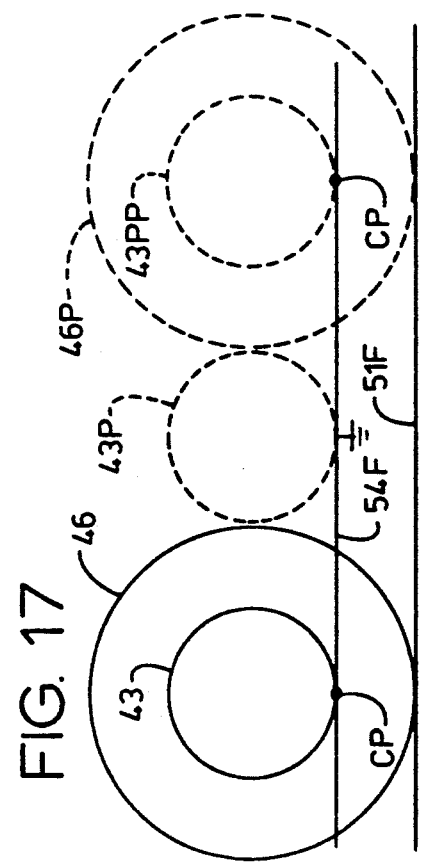
FIG. 16
FIG. 17

PITCH CHANGE MECHANISM FOR PROP FANS

The invention concerns a pitch change mechanism for aircraft propellers, and to the particular components in the mechanism which synchronize the pitches of all blades on the propeller.

CROSS-REFERENCE TO RELATED APPLICATIONS

This application is related to co-pending U.S. patent application Ser. No. 07/556,242, filed Jul. 23, 1990, for an AIRCRAFT PITCH CHANGE MECHANISM, U.S. patent application Ser. No. 07/550,009, filed Jul. 9, 1990, for a PROP-FAN PITCH-CHANGE MECHANISM, and U.S. patent application Ser. No. 07/556,145, filed Jul. 23, 1990, for PITCH CHANGE MECHANISM.

BACKGROUND OF THE INVENTION

FIG. 1 illustrates an aircraft powered by counterrotating propellers 6 and 9 of the ultra-high bypass, unducted fan type. The rotational directions are indicated by arrows 12 and 15. FIG. 2 illustrates a type of turbine system which can be used to directly drive the propellers 6 and 9.

In FIG. 2, fore propeller 9 (hatched) is attached to a first turbine 18 (also hatched) which rotates in direction 15 as indicated in FIG. 1. The aft propeller 6 is attached to a second turbine 21 and rotates in direction 12 of FIG. 1. Bearings 140 support the turbines and allow the rotation. A hot, high energy gas stream 30 in FIG. 2 is provided by a gas generator (not shown) and causes rotation of the turbines.

Propeller blades 6 and 9 (which are sometimes called fan blades, prop fans, or propulsor blades in the art because they have characteristics of hybrids between propellers and fans) are of variable pitch type. Variable pitch means that each blade can rotate about a respective pitch axis 6A or 9A in FIG. 2, as indicated by circular arrows 33. The principle reason for changing the pitch is to provide the blades with the angle of attack which is proper under the prevailing flight conditions of the aircraft and power setting of the engine.

The propeller blades can be carried by an annular carrier, such as the polygonal ring 24 shown in FIG. 3. The polygonal ring surrounds the turbine stage 23, which is shown in schematic cross-section in FIG. 2.

The source of motive power for causing the pitch change is generally located inside the annular flowpath of turbines 18 and 21 which gas stream 30 follows, such as in region 35 in FIGS. 2 and 3. Consequently, a mechanism is needed to carry mechanical torque from region 35, across the turbine flowpath 30, to the blades 6 and 9.

OBJECTS OF THE INVENTION

It is an object of the present invention to provide an improved pitch change mechanism for propeller blades.

It is a further object of the invention to provide a pitch change mechanism for propeller blades which changes pitch of the blades in unison.

SUMMARY OF THE INVENTION changes pitch of blades in an aircraft propeller. Upon malfunction of the gear system, a second planetary gear system adopts the pitch-changing function.

BRIEF DESCRIPTION OF THE DRAWINGS

In FIG. 15, an additional sub planet 250 has been added to planet 40.

FIG. 16 shows another form of the invention. In FIG. 16, retaining rings 230A–230D of FIG. 7 are supplemented by others.

FIG. 17 shows a compound planet gear 40 causing relative rotation of two movable ring gears.

DETAILED DESCRIPTION OF THE INVENTION

Figure 7:
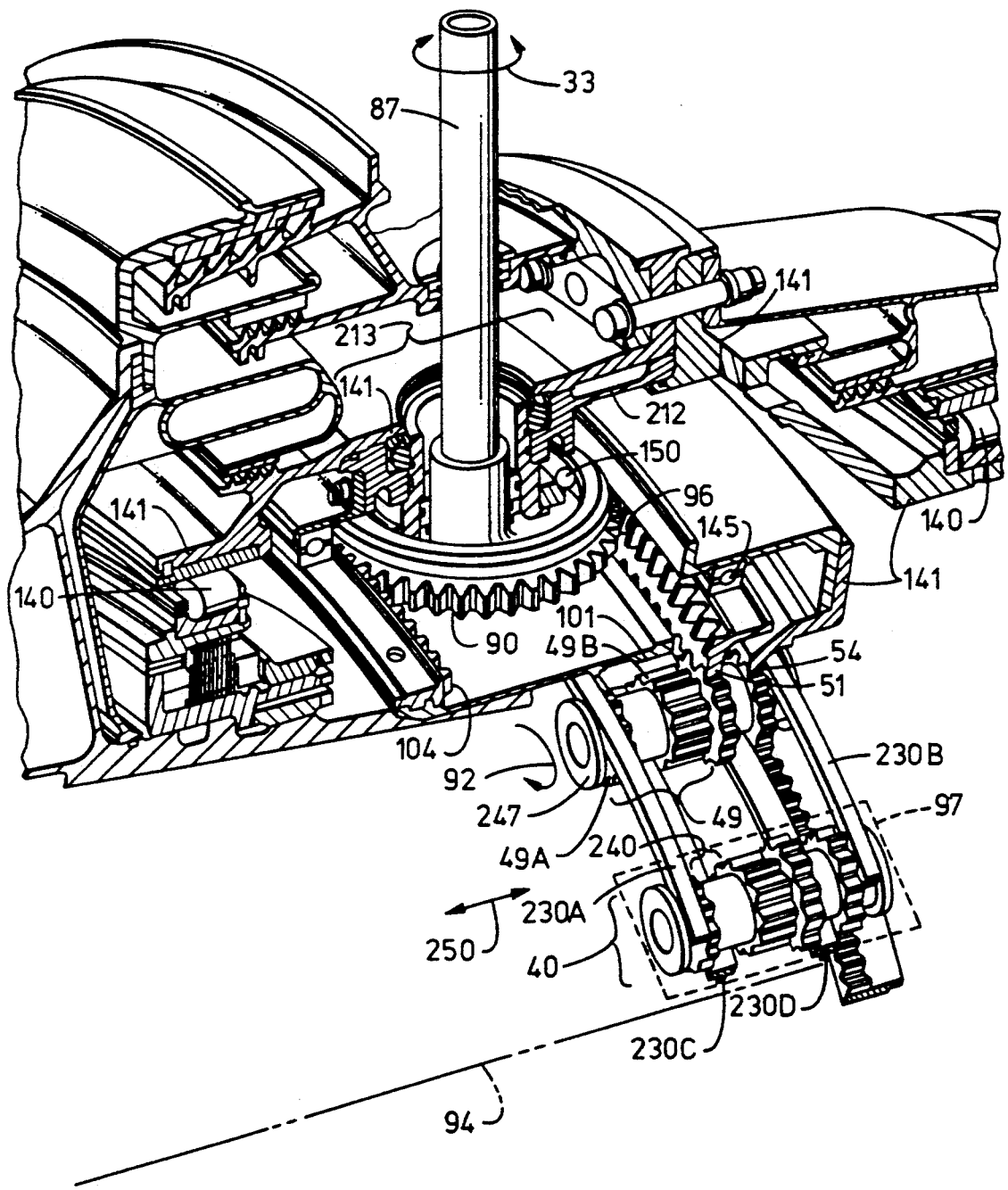
FIG. 7 shows one form of the invention in perspective cut-away form.

FIG. 7 illustrates one form of the invention, but, in order to simplify the explanation of FIG. 7, some operative principles will first be explained.

Figure 4:
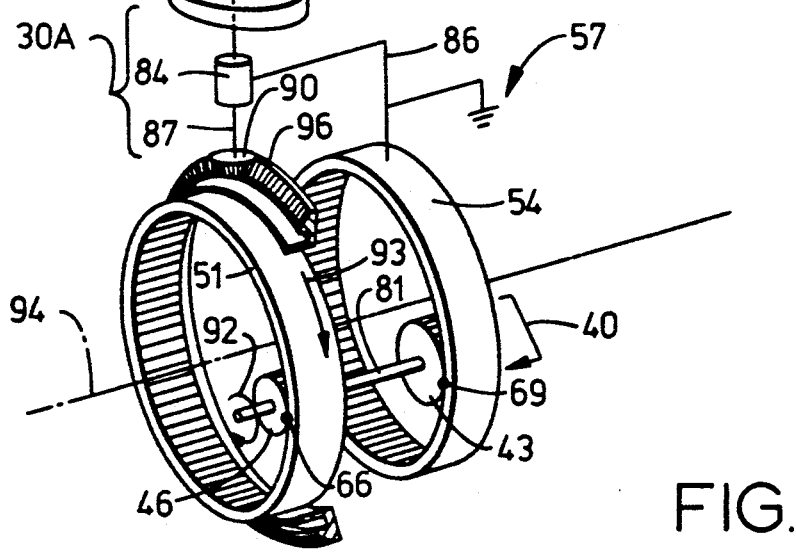
FIG. 4 illustrates a simplified form of the invention.

Simplified Form of the Invention—FIG. 4

Figure 3:
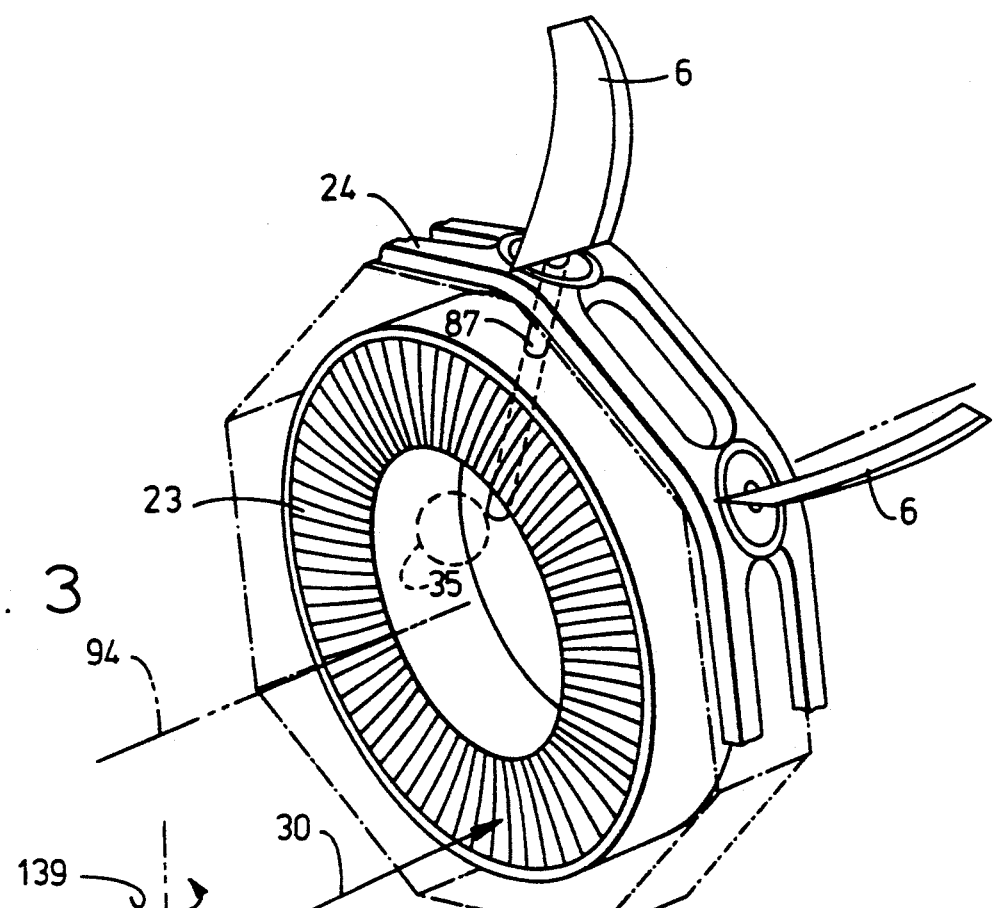
FIG. 3 illustrates a polygonal ring 24 which surrounds a turbine stage and supports the propeller blades.

FIG. 4 illustrates a simplified form of the invention. Shaft 87 extends through a turbine blade (schematically shown as cylinder 84), as does shaft 87 in FIG. 3. The turbine flow path occupies region 30A in FIG. 4. A fixed ring gear 54 is affixed to, and synchronous with, the turbine blade 84 and propeller blade 9, as indicated by bracket 86 and ground symbol 57. A movable ring gear 51 can rotate with respect to the fixed ring gear 54. When such rotation occurs, bevel ring gear 96 (attached to the ring gear 51) drives bevel blade gear 90, and pitch changes as indicated by circular arrows 33.

This rotation is caused by rotation of compound planets 40. Sub-planets 43 and 46 of planet 40 are locked to a shaft 81. A more detailed explanation of the mechanics of such relative rotation is given in the section at the end of the Specification entitled "Technical Considerations." However, at present, it is sufficient to observe that if the gear ratio between sub-planet 43 and fixed ring gear 54 is different than the gear ratio between sub-planet 46 and movable ring gear 51 (i.e., the system is a differential planetary system), then rotation of the compound planet 40 indicated by arrow 92 causes relative rotation of ring gears 51 and 54, and thus causes a change in pitch indicated by arrows 33.

During normal operation, with no pitch change occurring, ring gears 51 and 54 rotate at identical speeds: there is no relative rotation occurring between them. Further, compound planet 40 orbits along with them about the engine axis 94 as though the compound planet 40 were welded to the ring gears 51 and 54 at respective points 66 and 69. A more complex form of the invention will now be explained with reference to FIG. 5.

Figure 5:
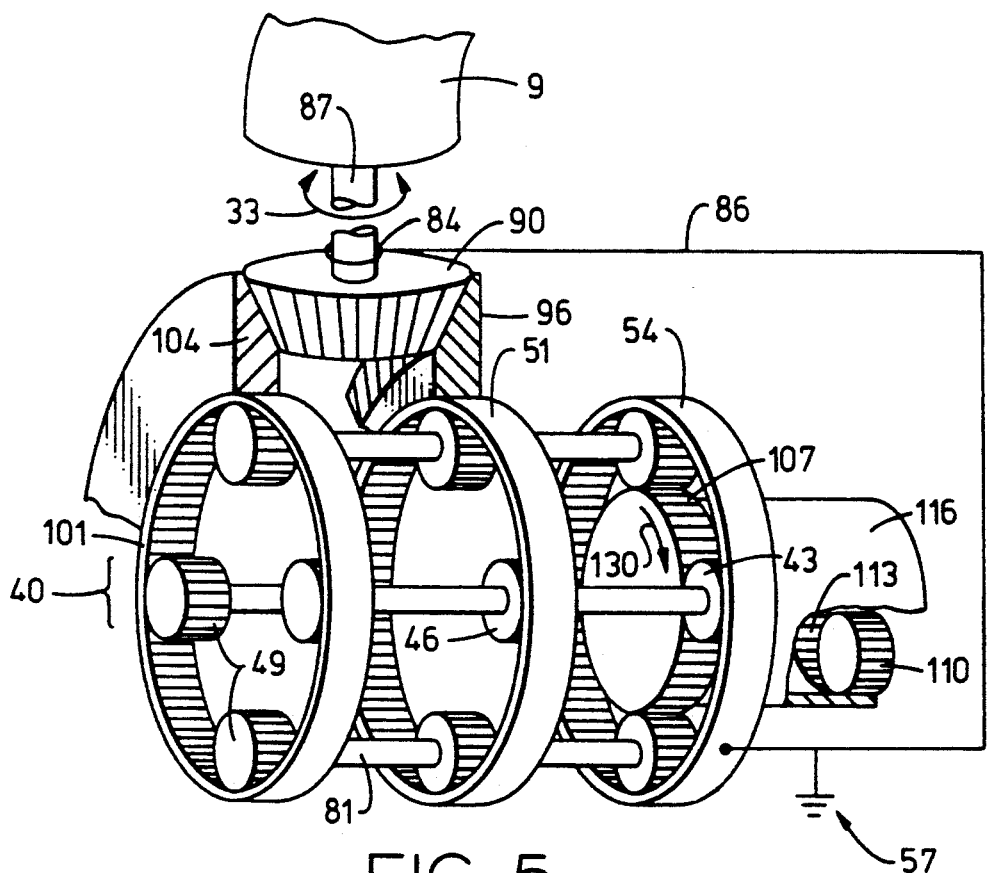
FIG. 5 illustrates a more complex form of the invention.

Second Form of the Invention—FIG. 5

Some components of FIG. 4 appear in FIG. 5, and retain the same reference numbers. In addition, a second movable ring gear 101 to which is connected a second bevel ring gear 104 is added. The second bevel ring gear 104 engages blade bevel gear 90 along with the first bevel ring gear 96. Because the two bevel ring gears engage a common bevel gear 90, during rotation they must rotate in opposite relative directions at the same speed.

Figure 5A:
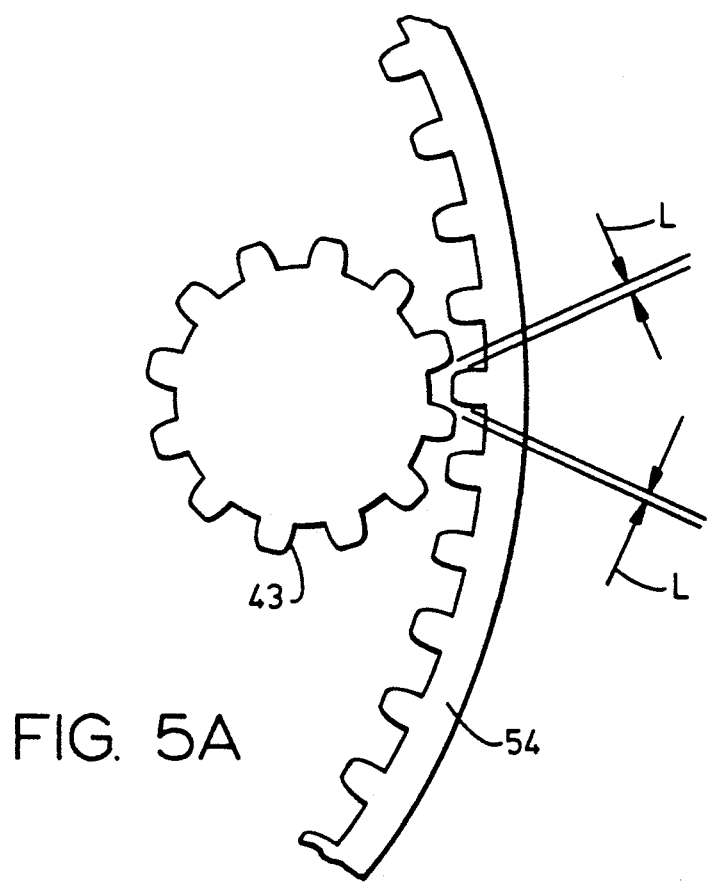
FIG. 5A illustrates a bi-directional lash L which is constructed into sub-planet 43 and fixed ring gear 54.

It is preferred, in systems having two movable ring gears 51 and 101 together with fixed ring gear 54, that there exist a bi-directional lash of approximately 0.040 inches between fixed ring gear 54 and sub-planet 43. Such a lash L is shown in FIG. 5A. With such a lash, sub-planet 43 does not contact fixed ring gear 54 during normal operation, and no power is transmitted between the sub-planet and fixed ring gear 54. However, power will be transmitted if a malfunction occurs, as will be later explained, in connection with FIGS. 7, 8, and 9.

In FIG. 5 there is an additional subplanet 49 of the compound planet 40. Further added to FIG. 5 is a sun gear 107 which drives the compound planets 40, and which is driven by a pinion 110 through an internal ring gear 113 carried by a shell 116. The operation of the system of FIG. 5 can be explained with reference to FIG. 6.

Figure 6A:
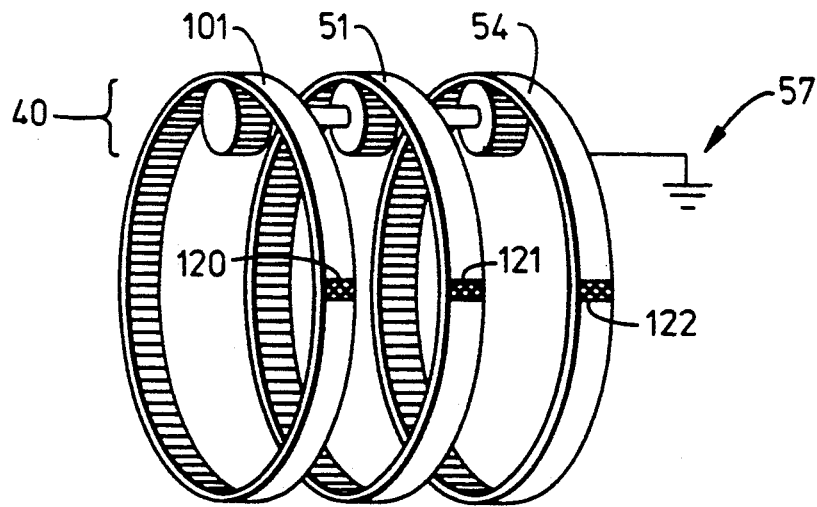
FIGS. 6A–6C each illustrate a simplified form of the invention as shown in FIG. 5 and illustrate in sequential fashion utilizing reference marks how ring gears 51 and 101 in FIG. 5 rotate.
Figure 6B:
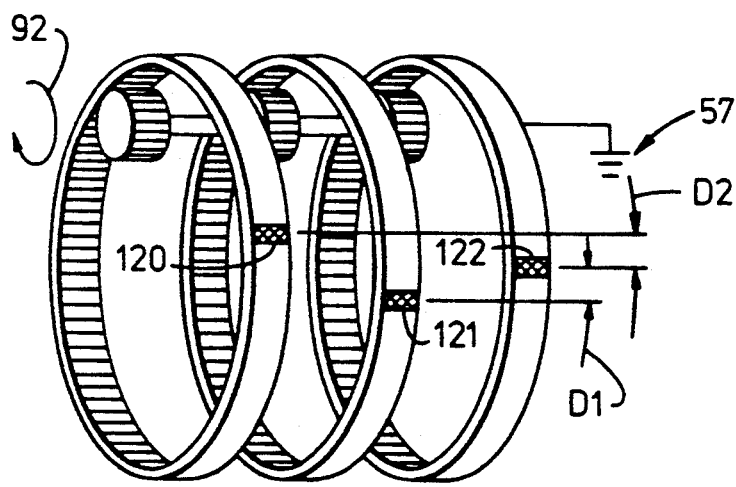

In FIG. 6, reference marks 120-122 are shown on the ring gears 101, 51, and 54. When the sun gear 107 of FIG. 5 (not shown in FIG. 6) rotates in the proper direction, compound planet 40 in FIG. 6 moves from the 12 o'clock position in FIG. 6A to the 11 o'clock position in FIG. 6B. For the reasons explained in "Technical Considerations," reference mark 120 moves upward and reference mark 121 moves downward, by respective displacements D2 and D1. Fixed ring gear 54 does not move, as indicated by ground symbol 57, and so reference mark 122 remains stationary.

Figure 6C:
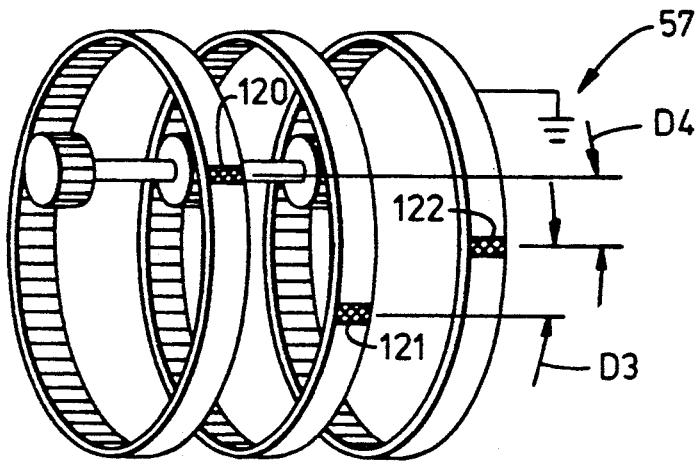

Further rotation of the planet gear 40, to the 10 o'clock position in FIG. 6C, causes the displacements to increase to D3 and D4. Therefore, rotation of the compound planet 40 causes opposite relative rotations of ring gears 51 and 101, causing a change in pitch, as indicated by arrow 33 in FIG. 5.

Several important features of the apparatus of FIG. 5 are the following.

Relative Rotation Between Sun 107 and Ring 54 Changes Pitch

One, relative rotation between sun gear 107 and fixed ring gear 54 causes the change in pitch. When such relative rotation is absent (that is, when the sun gear is synchronous with fixed ring gear 54), then no pitch change occurs.

Further, the direction of rotation (i.e., clockwise or counterclockwise) of sun gear 107 determines the direction of pitch change (i.e., toward fine pitch or coarse pitch). However, it is not necessarily important whether clockwise rotation causes pitch to become finer or coarser, as the direction of pitch change depends on the ratios between sub-planets 49 and 46 and their respective movable ring gears 101 and 51. Nevertheless, it is preferable to design the system such that slowing down of the sun gear 107 (with respect to the fixed ring gear 54) causes an an increase in pitch angle, rather than a decrease. This type of design provides at least two desirable features.

First, an increased pitch angle places the propeller blades closer to a feathered pitch position. Increased pitch decreases rpm. Consequently, with increased pitch during a malfunction, hazardous overspeed of the propeller can be prevented.

Second, the increased torque resulting from feathered pitch can be used to stop the rotation of the propeller: applying a brake to the sun gear 107 will increase pitch and torque, slowing or stopping the propeller during an in-flight shutdown of the engine.

Fixed Ring Gear 54 Actually Rotates; Changes in Speed of the Sun Gear 107 Relative to Gear 54 Cause Changes in Pitch A second important feature of FIG. 5 is that, in the absence of pitch change, sun gear 107 rotates at synchronous speed with fixed ring gear 54. In this case, sub-planets 43 can be viewed as being welded to both the sun gear 107 and the fixed ring gear 54. When pitch change occurs, relative rotation of sun gear 107 and fixed ring gear 54 must occur.

The preceding discussion has assumed that entire propeller of FIG. 4 has been non-rotating. During propeller operation, however, the fixed ring gear 54 actually rotates at synchronous speed with blade 9. Despite this rotation, ring gear 54 is stationary with respect to the blade 9, and so may be called "fixed" for that reason.

Since the fixed ring gear 54 in FIG. 5 rotates during operation, pinion 110 rotates continuously, in order to maintain the sun gear 107 synchronous with the fixed ring gear. This speed of the pinion can be called a synchronous multiple speed, because such speed will be determined by the gear ratio (i.e., a multiple) between the pinion 110 and the ring gear 113.

For pitch change to occur, the pinion 110 must deviate from the synchronous multiple speed. During the deviation, pitch is changing. When the desired pitch is reached, the pinion returns to the synchronous multiple speed, and pitch is maintained at its then-present value, until another deviation occurs.

When the fixed ring gear 54 is non-rotating, as occurs when the propeller is stopped, clockwise rotation of the pinion 110 changes pitch in one direction, while counterclockwise rotation changes pitch in the opposite direction. However, when the fixed ring gear 54 is rotating, as occurs when the propeller is rotating, the rotation of the pinion is always in the same direction. Pinion speed changes in order to change pitch, and the direction of speed change (i.e., faster or slower) determines the direction of pitch change (i.e., coarser or finer.)

A yet more complex form of the invention will now be explained, with reference to FIGS. 7, 8, and 9.

More Complex Form of the Invention

Figure 8:
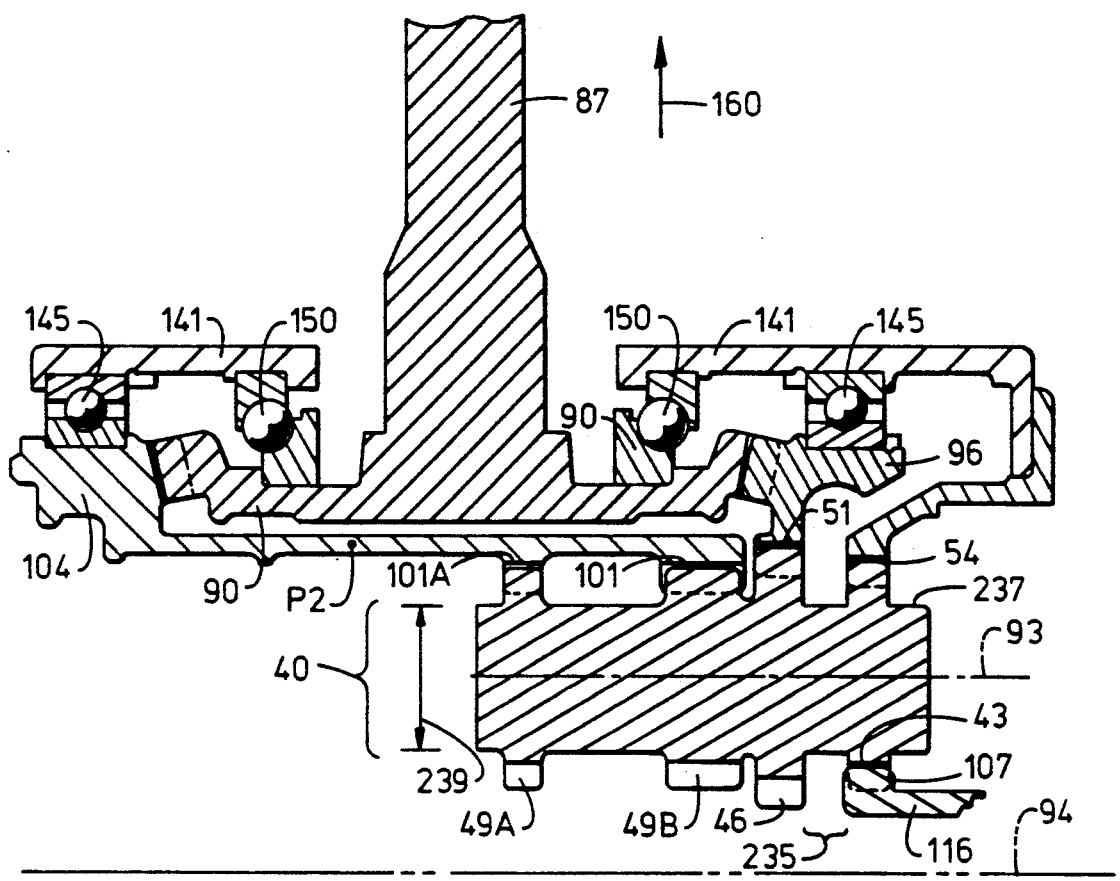
FIG. 8 is a simplified cross-sectional view of FIG. 7.
Figure 9:
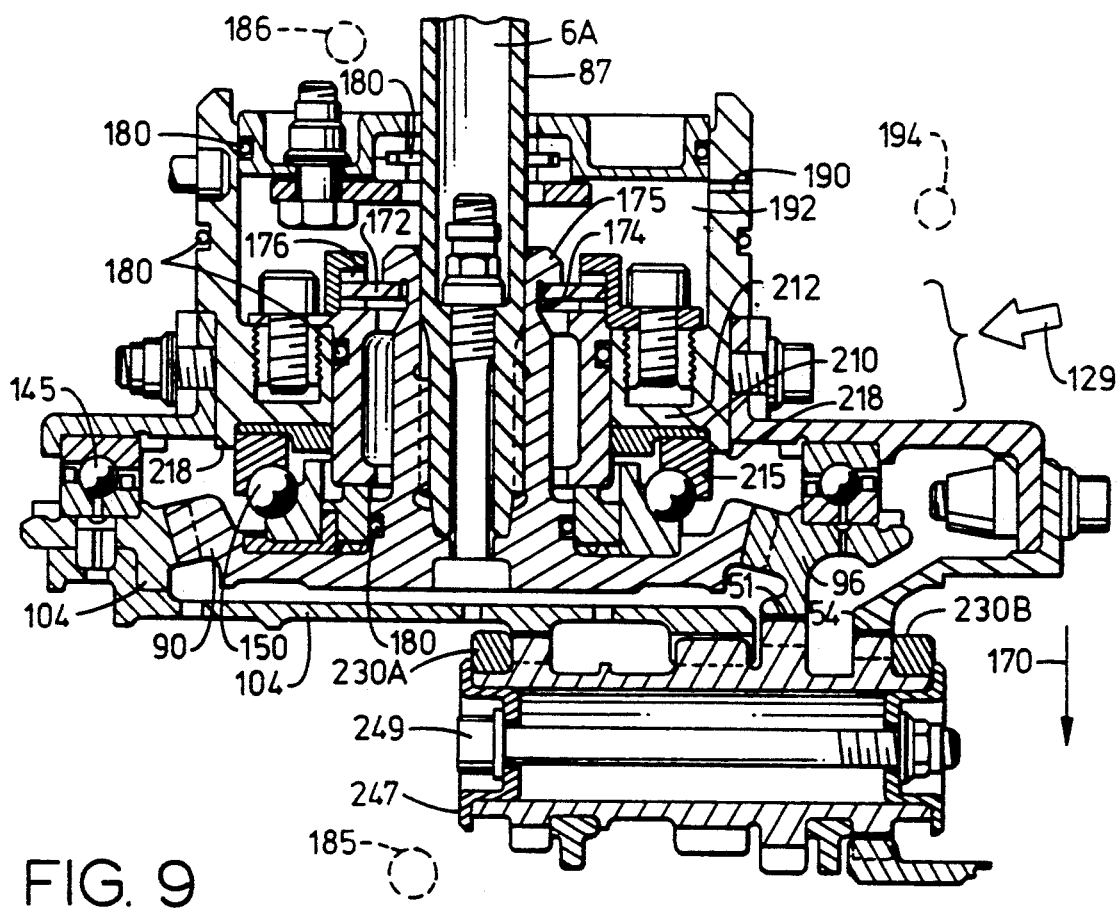
FIG. 9 is a view of the type shown in FIG. 8, but showing more detail.

FIGS. 7, 8 and 9

Figure 1:
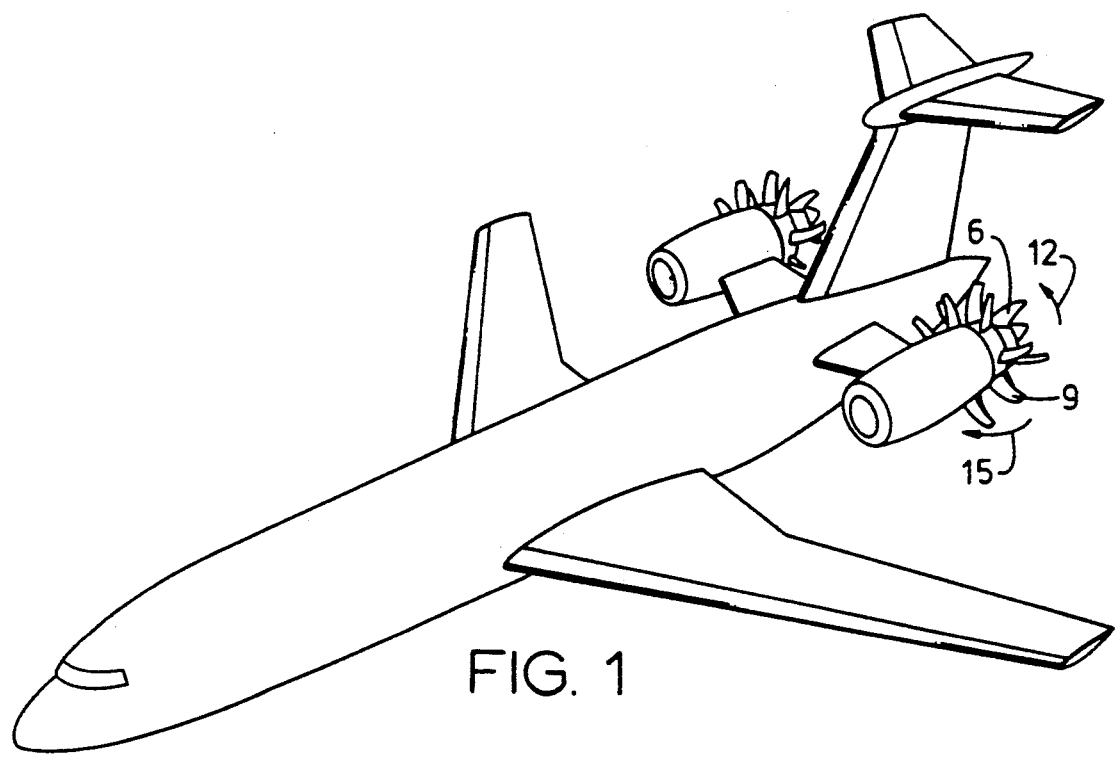
FIG. 1 illustrates an aircraft powered by engines which can use the invention.
Figure 2:
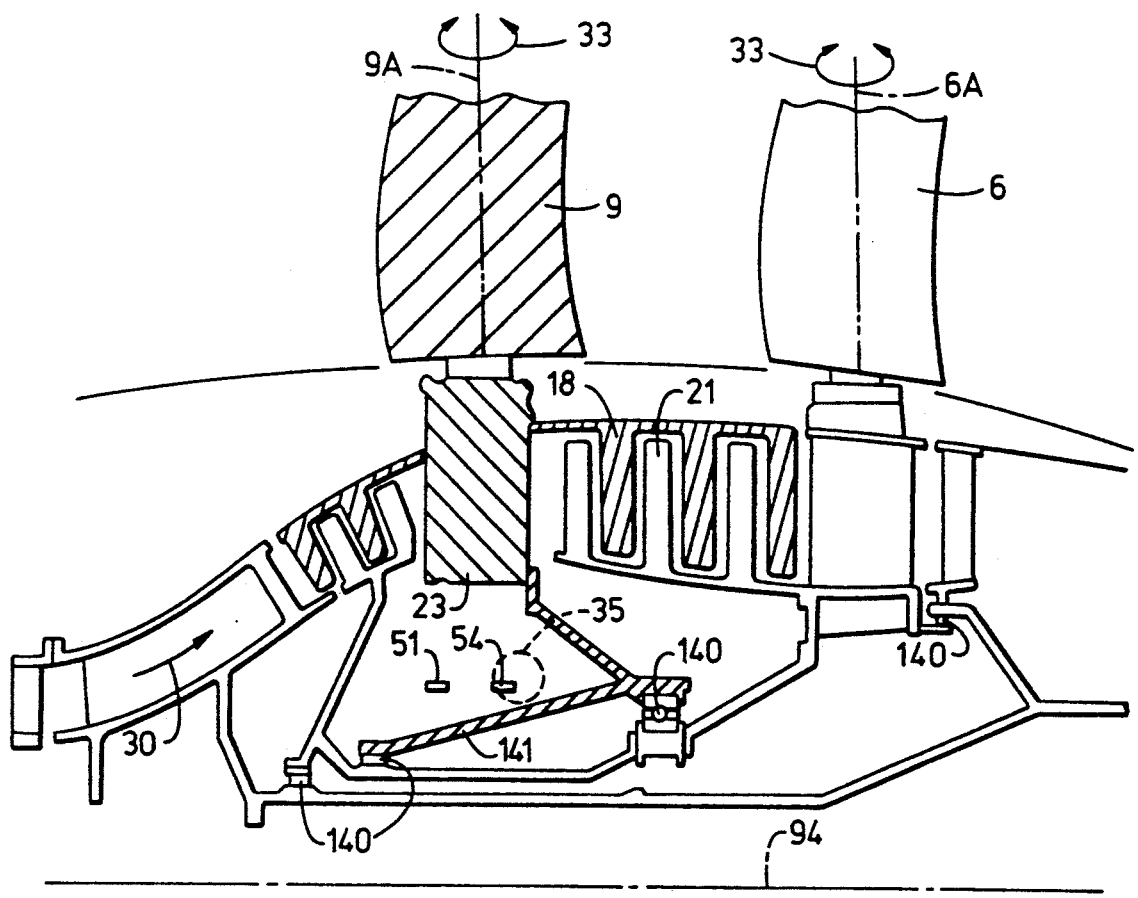
FIG. 2 illustrates a direct-drive turbine system which can drive the propellers of FIG. 1.

FIG. 8 is a simplified cross-sectional view of FIG. 7, and FIG. 9 shows FIG. 8 in more detail. The components of FIG. 5 which appear in FIGS. 7 and 8 retain the same reference numbers. Subplanet 49 in FIG. 5 is divided into two components 49A and 49B in FIG. 7, partly to save weight, and partly for a reason which will be explained later. Bearings 140 in FIG. 7 support rotating frame 141, which corresponds in function to schematic frame 141 in FIG. 2. Ring gears 51 and 101 in FIGS. 7 and 8 are supported by the rotating frame 141 by bearings 145. Fixed ring gear 54 is affixed to frame 141 (and is synchronous therewith). As in FIG. 4, rotation of planets 40 indicated by arrow 92 causes relative opposite rotation between ring gears 51 and 101, thereby causing a change in pitch.

Several important features of this form of the invention are the following.

Moments on Planets are Balanced

Figure 8A:
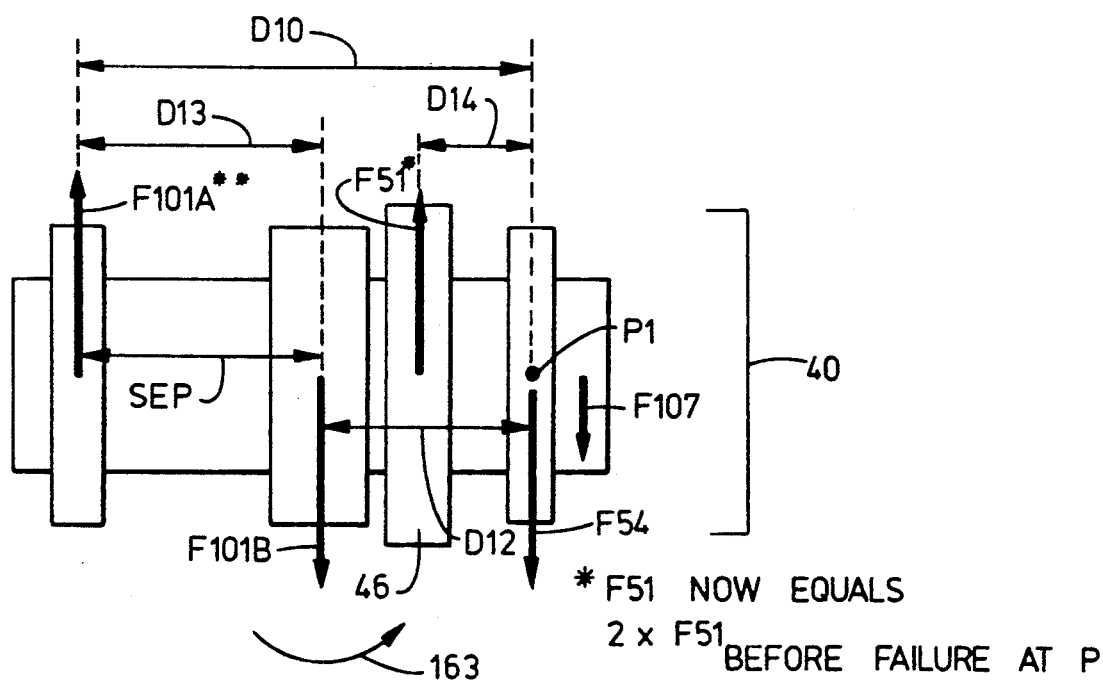
FIG. 8A is a moment diagram showing moments operating on the planet gears 40 in FIG. 8.

One, the moments on the planets 40 are balanced. FIG. 8A is a moment diagram, showing a cross-section of planet 40 in FIG. 8, taken in plane 97 in FIG. 7 which contains axis 93 in FIG. 8 and which is perpendicular to the plane of FIG. 8.

The forces in FIG. 8A are labeled as follows. F101A and F101B are the forces applied by ring gear 101 to the two sub planets 49A and 49B (because of the axial separation SEP between the sub-planets 49A and 49B, the forces F101A and F101B are different and, as will be later explained, operate in opposite directions). F51 is the force applied by movable ring gear 51.

F54 and F107 are the forces applied by the fixed ring gear 54 (on the top of sub-planet 43 in FIG. 5) and the sun gear 107 (on the bottom). Because of the bidirectional lash L in FIG. 5A, force F54 does not exist during normal operation.

For the present explanation, F101A is ignored. Consequently, F101B and F51 create a counterclockwise moment in plane 97, as indicated by arrow 163, which tends to rotate the planet gear 40 counterclockwise. This tendency to rotate can be called a skewing moment, as it tends to skew, or misalign, planets 40. The skewing moment is counteracted by the addition of sub-planet 49A. Subplanet 49A allows force 101A to operate (it was previously ignored) in order to balance the moments, and eliminate the skewing moment. Subplanet 49A can be called an outrigger planet, as it prevents tipping, or skewing, as does an outrigger on a canoe. Similarly, the ring gear 101A in FIG. 8 can be called an outrigger ring gear, because it cooperates with the outrigger planet gear.

That is, the system is designed such that the following equation is satisfied:

$$(F101A)(D10) + (F51)(D14) = (F101B)(D12)$$

That is, the clockwise moments equal the counterclockwise moments about point P1. The ring gear 101 applies two oppositely directed forces F101A and F101B to the planet 40.

Drag on Sun Gear 107 Increases When Moments on Planets Become Unbalanced

Two, the resistance seen by sun gear 107 in FIG. 8 increases when certain components break and unbalance the moments described above. For example, if ring gear 101 should suffer an annular fracture at point P2 in FIG. 8, the torque in the bevel gear 104 drops to zero. However, the ring gears 101 and 101A are still connected and can react the skewing moment applied to the planet 40 by the ring gears 51 and 54, as illustrated in FIG. 8A. In that Figure, the forces F51 and F54 are due to respective ring gears 51 and 54. Pitch can still change, despite the annular fracture at point P, using movable ring gear 51, but the work required by the planet 40, and thus sun gear 107, will increase, for the following reason.

In general, and ignoring losses, power transmitted between two gears is a function of torque multiplied by rpm:

$$Power_{transmitted} = Torque \times rpm.$$

However, in practice, power transmitted does not equal power received because of losses. In a simplified sense, the losses can be viewed as a percentage of power transmitted. With this simplification, an explanation of the increase in load which occurs on sun gear 107 can be given.

During normal operation, when sub-planets 46, 49A, and 49B are transmitting the pitch-changing power, the losses described in the paragraph above occur in load paths between the incoming power source and the outgoing power. One such load path is that including pinion 110 in FIG. 5 (the power source), internal ring gear 113, sun gear 107, sub-planet 43, sub-planet 46, movable ring gear 51, bevel ring gear 96, and blade bevel gear 90 (the load). The other load path leads from pinion 110 to bevel ring gear 104.

However, when one of these load paths ceases to transmit power, as when the breakage described above occurs, then two important events occur. First, all of the power is transmitted along the other path and, second, the bi-directional lash L in FIG. 5A disappears, and sub planet 43 now contacts fixed ring gear 54. The latter event creates a load path to ground, which dissipates energy.

Therefore, the system of FIGS. 7, 8, and 9 can continue to operate when a malfunction occurs in movable ring gears 51 or 101. The malfunction causes the load upon sun gear 107 to increase.

Gear Lash of Bevel Gears 90 is Automatically Eliminated

Three, the system of FIG. 9 automatically eliminates gear lash between the blade bevel gear 90 and the bevel ring gears 96 and 104. The lash occurs because of (1) the difficulty in perfectly manufacturing all components of FIGS. 7, 8, and 9, and (2) the changes in dimension which occur because of temperature and centrifugal loading.

Figure 10A:
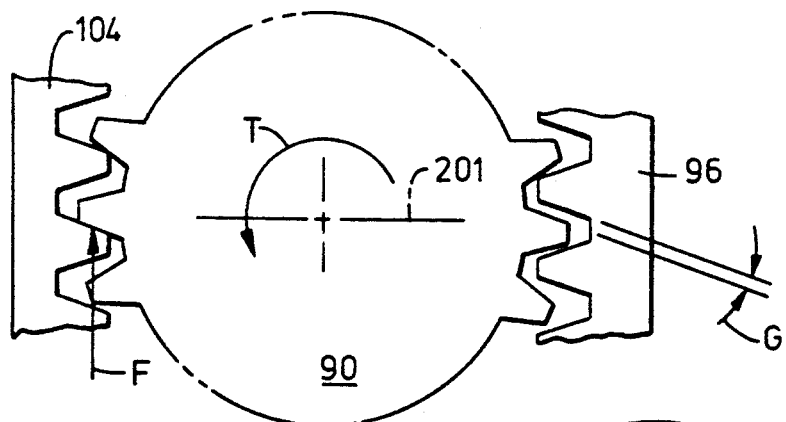
FIGS. 10A and 10B illustrate schematically.

The lash can cause ring gears 51 and 101 to unequally share the load of blade bevel gear 90. That is, as shown in FIG. 10A, a gap G may exist even if the misalignments are large. FIG. 10C illustrates in perspective form the condition depicted schematically in FIG. 10A while omitting torque T, force F, and gap G for clarity. Because of the gap G, the torque T applied by the propeller blade (not shown in FIG. 10A) is reacted solely by force F on the bevel gear 104: ring gear 101 carries all the load, while bevel gear 96 and ring gear 51 carry none. [This torque T arises chiefly from two sources: (1) aerodynamic loads applied to the blade and (2) the centrifugal twisting moment of the blade, which is the torque resulting from centrifugal force and which tends to drive the blade into the flat pitch position.]

Figure 10B:
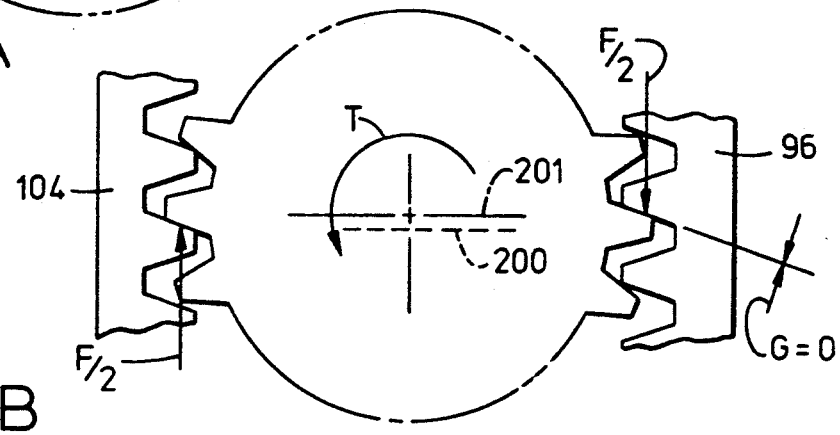
Figure 10C:
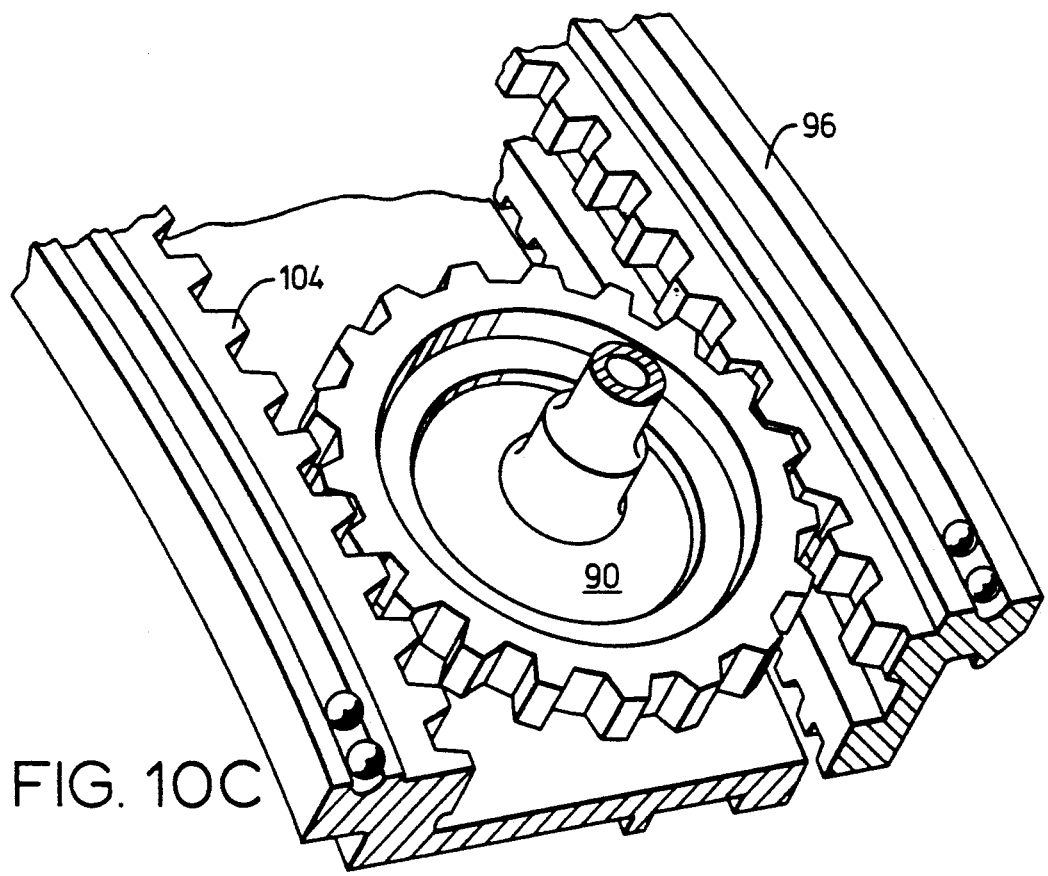
FIGS. 10C and 10D illustrate in perspective views corresponding respectively to FIGS. 10A and 10B, how bevel gear 90 in FIG. 7 can shift in order to share load between bevel ring gears 96 and 104.

The apparatus of FIG. 9 eliminates the gap G by allowing the blade bevel gear 90 in FIGS. 10A and 10B to shift, as indicated by the shift of the center line 201 from phantom center line 200. After the shift, each bevel ring gear 96 and 104 now reacts torque T with a force F/2. The apparatus which allows this shifting will be explained with reference to FIGS. 9 and 11.

In FIG. 9, three components (210, 215, and 218) are indicated by an arrow 129 at the right side of the Figure. These components are shown in perspective view in FIG. 11. An annular disc 210 contains a shoulder 210A. The disc 210 is piloted on its internal diameter (ID), and cannot move. Circumferential movement of the disc 210 is prevented by an apparatus not shown, but can be illustrated by a pin 211. Therefore, disc 210 is fixed in position with respect to annular carrier 212 in FIGS. 9 and 11. The carrier 212 can be viewed as the annular part of rotating frame 141 indicated by bracket 213 in FIG. 7. For simplicity, the carrier 212 is shown as cylindrical, but it can be polygonal, as is ring 24 in FIG. 3.

Figures 11, 12, 13:
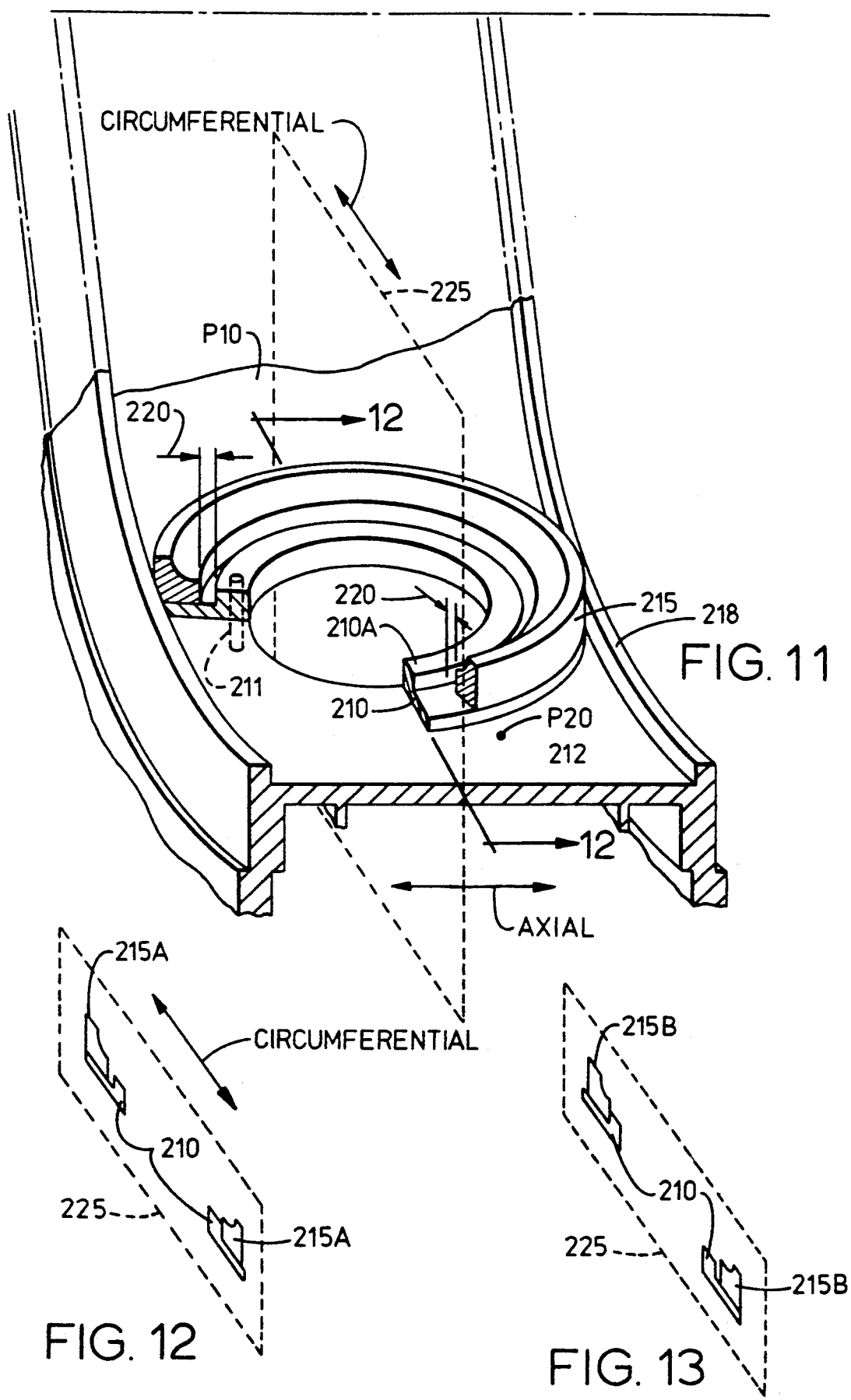
FIG. 11 shows how three particular components of FIG. 9 allow the shifting shown in FIGS. 10A and 10B.
FIGS. 12 and 13 are cross-sectional views taken in a phantom plane 225 in FIG. 11.

Bearing race 215 in FIGS. 9 and 11 rests upon the disc 210. (In FIG. 11, the annular curved track in which the balls 150 of FIG. 9 roll is not shown for simplicity.) The inner diameter of the race 215 is larger than the outer diameter of the shoulder 210A, so that a clearance 220 in FIG. 11 exists between the bearing race 215 and the shoulder 210A.

Figure 10D:
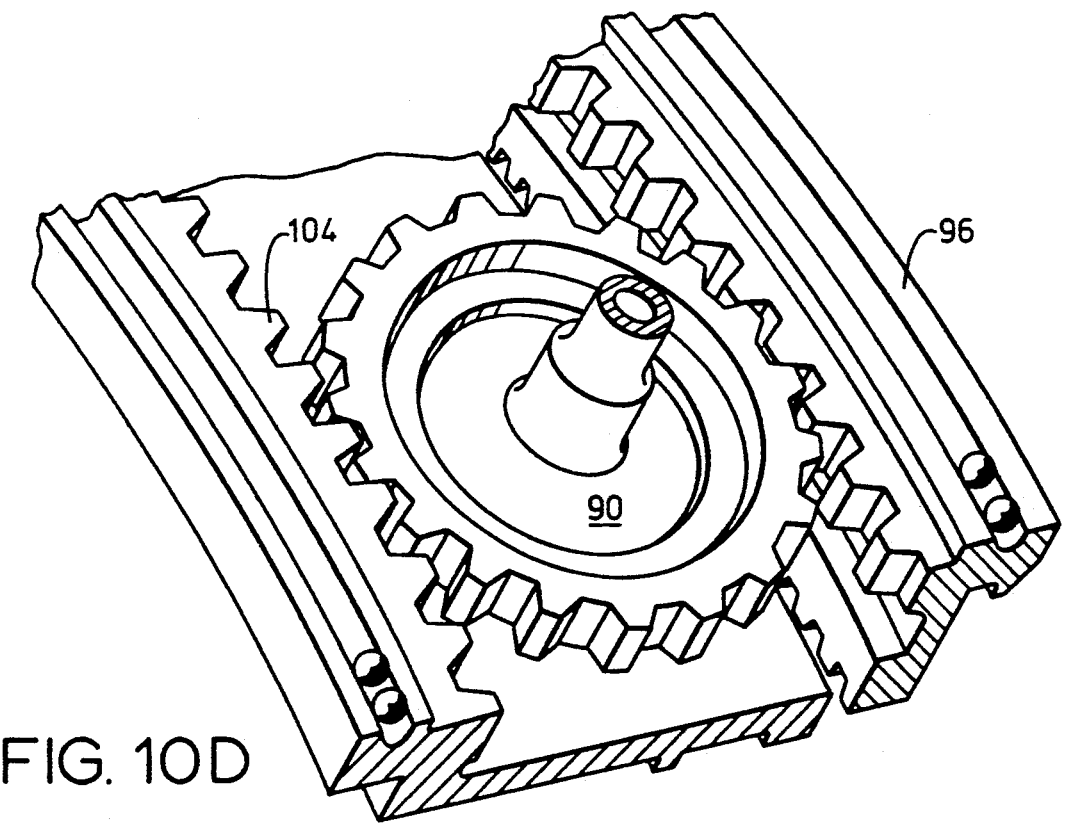

This clearance allows the bearing race 215 to shift, thus allowing the pinion movement described above with reference to FIG. 10B. FIG. 10D illustrates in perspective form the condition depicted schematically in FIG. 10B, while eliminating blade torque T, gear force F/2, and gap G for clarity. The shifting is shown in FIGS. 12 and 13, which are cross-sectional views taken in phantom plane 225 in FIG. 11. FIG. 12 shows the bearing race 215A shifted toward point P10 in FIG. 11, while FIG. 13 shows the bearing race 215B shifted toward point P20: the race 215 can shift tangentially, on a straight line. However, axial movement of the bearing race 215 is prevented by rails 218.

Figure 14:
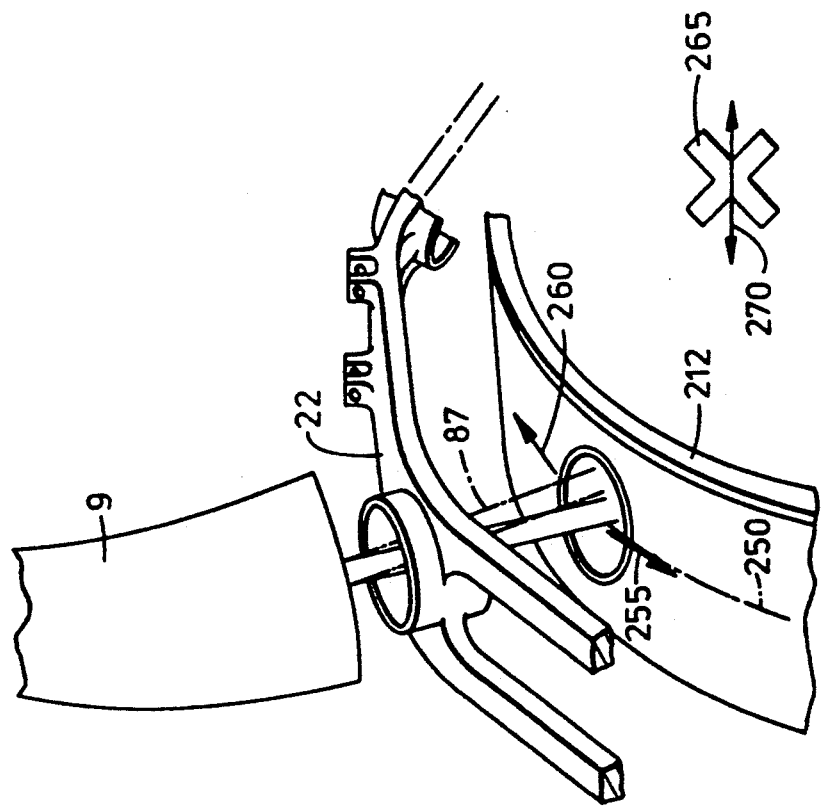
FIG. 14 illustrates in exaggerated form how shaft 87 moves when the bevel gear 90 moves as shown in FIGS. 10A and 10B.

Therefore, as shown in extremely exaggerated form in FIG. 14, shaft 87 can move circumferentially along the center line 250 of annular carrier 212, as indicated by arrows 255 and 260. However, as indicated by the cross 265 superimposed on arrows 270, axial motion of shaft 87 is prohibited because bearing race 215 in FIG. 11 is confined between rails 218. This restriction provides a positive gear tip clearance on both sides.

Mounting of Bevel Gear 90

Four, bevel gear 90 is attached to shaft 87, and the centrifugal load of both is carried by bearings 150 shown in FIGS. 7, 8, and 9 which transmit the load to the annular carrier 212. When the system is nonrotating, the absence of centrifugal force can allow the blade bevel gear 90 and shaft 87 to drop in direction 170 in FIG. 9. The invention prevents such dropping by a split washer 172 which engages an edge 175 of an annular channel 174 on the shaft 87 of the blade bevel gear. Shims 176 maintain the washer at the proper radial height, that is, that the proper location along pitch axis 6A.

Lubricant Seals

Five, seals 180 in FIG. 9 prevent migration of lubricant from radially inner regions 185 to radially outer regions 186. If such migration were allowed, lubricant would reach outer region 186, would be lost to the external environment, and, eventually, the lubricant supply would become depleted.

To further inhibit lubricant migration, bleed hole 190 allows chamber 192 to attain a pressure near or equal to that in region 194. Region 194 is pressurized at a higher pressure than inner region 185 in FIG. 9 for reasons unrelated to the present invention. The pressure gradient between chamber 192 and inner region 185 further inhibits migration of lubricant into the chamber 192, and thence to outer region 186.

Planet Cage

Six, planets 40 in FIG. 7 are captured axially by rings 230A-230D. The rings differ from prior art planetary cages in the respect that they do not maintain circumferential spacing between the planets 40, but (1) carry radial loads of the planets 40 and (2) keep the planets 40 in axial alignment with the sun and ring gears. The rings prevent motion of the planet gears 40 along directions 250 in FIG. 7. (The gear meshes keep the planets parallel with axis 94.) Circumferential spacing of the planets is maintained by the meshing of gear teeth of sun gear 107, fixed ring gear 54, and movable ring gears 51 and 101.

To maintain axial position, the rings cooperate with annular channels such as 235 in FIG. 8 in the planet 40. During rotation, centrifugal force (minus the radial gear force) presses the bottoms 237 in FIG. 8 of the channels against the rings (not shown in FIG. 8). Consequently, when planet 40 rotates, friction causes the outer rings 230A and 230B in FIG. 7 to rotate about centerline 94.

The inner rings 230C and 230D also rotate about axis 94, in the same direction as rings 230A and 230B, but at higher speed, similar to the speed of the sun gear 107. An interference fit is created between the rings and the planets. That is, the difference between the radii of the inner and outer rings is about 0.002 to 0.004 inches less than dimension 239 in FIG. 8. Restated, the annulus between the outer diameter of the inner ring, and the inner diameter of the outer ring, is smaller in height (by about 0.002 to 0.004 inches) than dimension 239 in FIG. 8, thus squeezing planet 40 between the two rings.

The squeezing forces the rings to rotate by friction when the planets rotate. Further, since the inner rings are smaller in diameter than the outer rings, the inner rings will rotate faster.

Another form of the invention will be described in connection with FIG. 15.

Figure 15:
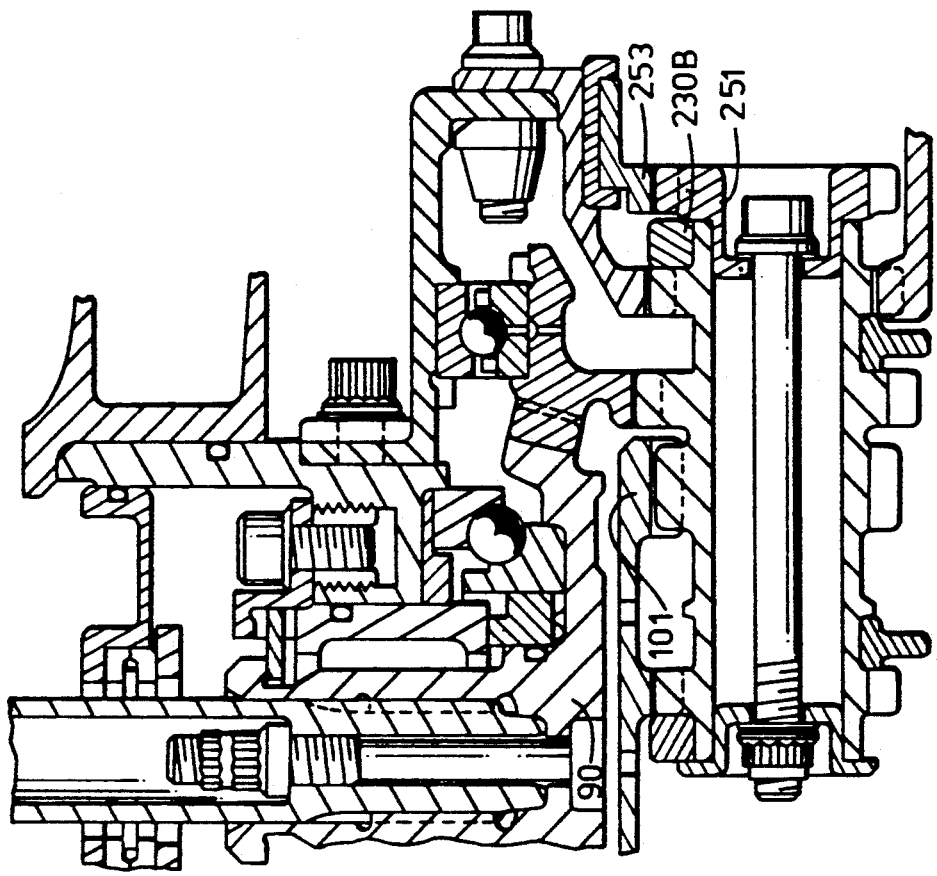
FIG. 15 shows another form of the invention.

Another Form of the Invention—FIG. 15

FIG. 15 is substantially similar to FIG. 9, with the exception of an added feedback gear 251. Feedback gear 251 serves the two-fold purpose of acting as a retaining flange, as does flange 247 in FIGS. 7 and 9, in order to capture ring 230B in FIG. 15. Further, the feedback gear 251 drives a feedback ring gear 253 (not previously discussed) which can drive an additional gear train (not shown) from which pitch angle can be measured.

For example, if feedback ring gear 253 were the same diameter as second movable ring gear 101, and the gear ratios between these two ring gears and their respective subplanets on planet 40 were the same, then feedback ring gear 253 and second movable ring gear 101 would be locked together, in phase, about spin axis 94.

Since the angular position of the second movable ring gear 101 indicates the angular position of blade bevel gear 90, then the angular position of the feedback ring gear 253 similarly indicates pitch angle. Of course, it is not necessary that the feedback ring gear be locked to the second movable ring gear 101 in this manner, but that a different relationship would still allow pitch to be ascertained from the feedback ring gear 253.

Another Form of the Invention—FIG. 16

Another form of the invention is shown in FIG. 16, which is substantially identical to FIG. 9, with the exception of two added planet rings 230E and 230F, located outward of respective rings 230A and 230B. A rolling interface 260 exists between ring pairs 230A/230E and 230B/230F. The rings 230E and 230F are supported by respective ring gears 101 and 54 by using a tight fit. The added rings serve to reduce radial movement of the planets 40 with respect to the ring gears 54 and 101.

Several significant features of the invention are the following.

One, the fixed ring gear 54 only engages planet 43 when the net moment on planet 40 changes and becomes sufficiently unbalanced. The bi-directional lash L in FIG. 5A prevents engagement otherwise. Consequently, fixed ring gear 54 and the planets 40 provide a redundant, back-up, differential planetary system for changing pitch.

Two, as shown in FIGS. 10A–10D, and 11, a misalignment compensator is provided which allows the torque of each propeller blade (not shown) to drive the blade bevel gears 90 in FIG. 10B into equal engagement With the bevel ring gears 96 and 104. This equal engagement distributes the torque load equally between the bevel ring gears. Further, the equal load sharing serves to provide the proper moment loads in FIG. 8A upon the planet gears 40, in order to reduce skew of the planets.

Three, the planet support system (comprising rings 230A–230D in FIG. 7) carries the radial loads of the planets 40, and maintains them in axial position. The planet support system is not significantly involved in maintaining circumferential spacing of the planets, nor in preventing skew of the planets. The latter is true, chiefly because of the moment balance described in connection with FIG. 8A.

TECHNICAL CONSIDERATIONS

The relative rotation between ring gears 51 and 54 which planets 40 cause can be explained as follows.

In FIG. 17, ring gears 51 and 54 in FIG. 4 are shown as flat surfaces 51F and 54F. That is, in FIG. 17, the ring gears are shown as having infinite diameters. Surface 54F, representing fixed ring gear 54, is restrained against movement as indicated by ground symbol 57A. Sub-planets 43 and 46 of planet 40 engage the flat surfaces 54F and 51F without slipping. Because the sub-planets engage the ring gears at different gear ratios, the sub-planets are shown with different diameters.

Assume that sub-planets 43 and 46 were not locked together, and that surface 51F is also grounded. Then, if each rotates one revolution to the right, each would then occupy phantom positions 43P and 46P. However, since the sub-planets are, in fact, locked together, they must remain concentric, as shown by phantom positions 43PP and 46P, and so surface 51F must be drawn leftward. Contact point CP can be viewed as a fixed point on sub-planet 43.

Therefore, if there are different gear ratios between ring gears 51 and 54 and their respective sub-planets, then rotation of the planet causes relative movement between the ring gears.

Numerous substitutions and modifications can be undertaken without departing from the true spirit and scope of the invention as defined in the following claims.

What is claimed and desired to be secured by Letters Patent is the invention defined as follows:

1. A pitch-change mechanism for an aircraft propeller, comprising:
   (a) a planetary gear system which includes planet gears, driven by a sun gear, which causes opposite relative rotation of ring gears which change pitch; and
   (b) a redundant ring gear near the planet gears, which
      (i) does not engage the planet gears during normal operation and
      (ii) does engage the planet gears during malfunctions.

2. A pitch-change mechanism for an aircraft propeller, comprising:
   (a) a planetary gear system which includes planet gears, driven by a sun gear, which causes opposite relative rotation of ring gears which change pitch;
   (b) a redundant ring gear near the planet gears which
      (i) does not engage the planet gears during normal operation and
      (ii) does engage the planet gears during malfunctions; and
   (c) wherein the power which said sun gear must deliver increases during said malfunctions.

3. A pitch-change mechanism for an aircraft propeller, comprising:
   (a) a pair of ring gears which
      (i) are movable with respect to the propeller;
      (ii) are geared to propeller blades for pitch changing; and
      (iii) engage planet gears at different gear ratios; and
   (b) a third ring gear, which is fixed with respect to the propeller blades, for engaging the planet gears during malfunctions.

4. A pitch-change mechanism for an aircraft propeller, comprising:
   (a) a plurality of propeller blades;
   (b) an array of radial drive shafts, one for each propeller blade;
   (c) a plurality of drive gears, one on each drive shaft;
   (d) a first ring gear engaging all drive gears, such that rotation of the first ring gear causes a change in blade pitch;
   (e) a second ring gear engaging all drive gears, such that rotation of the second ring gear causes a change in blade pitch and requires opposite relative rotation of the first ring gear;

(f) a plurality of planet gears engaging both ring gears at different gear ratios such that rotation of the planet gears causes opposite relative rotation of the ring gears; and (g) a third ring gear which is fixed with respect to the propeller and which the planet gears engage only when load on the planet gears from the first or second ring gears decreases due to a corresponding malfunction of the first or second ring gears.

5. A pitch-change mechanism for an aircraft propeller, in which a structure supports propeller blades, comprising:

(a) first and second, movable, ring gears linked to propeller blades for changing pitch;

(b) a fixed ring gear which does not move with respect to said structure;

(c) planet gears which engage the first and second ring gears for inducing pitch change, but are separated from the fixed ring gear; and (d) a means for providing load-carrying redundancy comprising the fixed ring gear, such that failure in either of the first or second ring gears causes engagement of the planets with the fixed ring gear.

6. A pitch-change mechanism for an aircraft propeller, comprising:

(a) a blade bevel gear connected to a propeller blade;

(b) first and second planetary ring gears, which bear respective first and second bevel ring gears, both of which bevel ring gears jointly drive the blade bevel gear;

(c) a fixed ring gear which is fixed with respect to the propeller blade; and (d) a planet gear having first, second, and third sub-gears, the first and second of which engage the first and second ring gears, and the third of which engages the fixed ring gear only upon malfunction of the first or second ring gears.

7. The pitch-change mechanism of claim 6 further comprising:

(e) a sun gear driving the planet gear; and (f) means for reducing, to near zero, net moment in the planet gear, such that said first and second planet sub-gears remain engaged with said first and second ring gears during normal operation without the assistance of a torque-load-bearing planet gear carrier.

8. In an aircraft propeller, a back-up system for a pitch-change mechanism of the planetary type, having planet gears which drive ring gears which drive a linkage which changes pitch, comprising:

(a) a fixed ring gear which is synchronous with the propeller; and (b) sections of the planet gears engageable with the fixed ring gear when moments on the planet gears become unbalanced, but not engageable otherwise.

9. In an aircraft propeller of the variable pitch-type which includes a plurality of planet gears in a pitch-change gear train, the improvement comprising:

(a) a support for the planet gears which comprises,
(i) inner rings and outer rings which capture the planets therebetween; and (b) sun and ring gears which reduce the skewing moment on the planet gears to near zero.

10. The improvement of claim 23, wherein said support:

restrains the planet gears against axial movement;

(b) resists no skewing torque of the planet gears, created by noncentrifugal loads, during normal operation;

(c) carries all centrifugal load of the planet gears; and (d) has no involvement in maintaining circumferential spacing of the planet gears.

11. A system for providing radial support for planet gears in a pitch-change mechanism for an aircraft propeller, comprising:

(a) a plurality of planet gears distributed along an orbit;

(b) two outer annular carriers which bear the centrifugal load of the planet gears; and (c) two inner annular carriers which squeeze the planet gears against the outer annular carriers.

12. A pitch-change system for an aircraft propeller, comprising:

(a) a pair of ring gears linked to propeller blades such that opposite relative rotation of the ring gears changes pitch of the blades;

(b) a plurality of planet gears engaging the pair of ring gears at different gear ratios, the ring gears creating a skewing moment in the planets;

(c) an outrigger ring gear fastened to one of the ring gears; and (d) an outrigger planet on each planet gear, engaging the outrigger ring gear, for reducing the skewing moment.

13. A pitch-change mechanism for an aircraft propeller, comprising:

(a) a sun gear;

(b) a plurality of planet gears driven by the sun gear, each planet gear including first and second sub-gears of different tooth number;

(c) first and second ring gears driven respectively by the first and second sub-gears, both ring gears linked to propeller blades for pitch changing;

(d) means for reducing net moment on the planet gears; and (e) wherein each of said planet gears further includes a third sub-gear which becomes engaged with a fixed ring gear if the normal moments acting on said planet gears become unbalanced.

14. A gear system for changing pitch in an aircraft propeller, comprising:

(a) a fixed ring gear which is synchronous with the propeller;

(b) a plurality of generally radial drive shafts, each one driving a propeller blade;

(c) first and second movable ring gears generally coaxial with the fixed ring gear;

(d) gear means linking the first and second movable ring gears with all drive shafts such that opposite relative rotation of the movable ring gears causes the blades to change in pitch; and (e) a plurality of planet gears which engage the first and second ring gears during normal operation, and do not engage the fixed ring gear during normal operation.

15. In a pitch-change mechanism for an aircraft propeller, a planetary gear train comprising:

(a) an axis of rotation of the propeller;

(b) first and second movable ring gears which
(i) are generally coaxial with the propeller axis and
(ii) rotate in opposite relative directions in order to drive a plurality of common gears, each linked to a propeller blade;

(c) a fixed ring gear which is (i) generally coaxial with the first and second movable ring gears and
(ii) synchronous with the propeller;
(d) a plurality of planet gears distributed along an orbit and engaging a first ring gear, the second ring gear, and not the fixed ring gear;
(e) a pair of large rings concentric with a pair of small rings which capture the planets in an annulus therebetween; and
(f) a sun gear driving the planet gears, wherein the planet gears engage the fixed ring gear during malfunctions.

16. A system for reducing gear lash in an aircraft propeller of the variable pitch type, comprising:
(a) a turbine including an axis of rotation;
(b) a ring surrounding said turbine for carrying a plurality of propeller blades, and including a plurality of openings through which the blades extend;
(c) an array of blade gears, each for changing pitch of a respective propeller blade;
(d) a pair of ring gears for jointly driving said blade gears;
(e) a plurality of disks, one surrounding each of said openings and fixedly attached to said ring, wherein each of said disks includes a surface of revolution corresponding to an outside diameter of said disk;
(f) a plurality of bearing races, one resting on each of said disks and rotatably connected to said blade gears, wherein each of said bearing races includes a surface of revolution corresponding to an inside diameter of said bearing race;
(g) a plurality of annular clearances, one formed therebetween each of said bearing race surface of revolution and a corresponding one of said disk surface of revolution;
(h) an axial direction parallel to said turbine axis of rotation;
(i) a tangential direction extending therebetween said ring openings;
(j) a misalignment compensator for each of said blade gears which allows propeller blade torque to move each of said blade gears into engagement with both of said ring gears such that unequal loading on the two ring gears by said blade gears is reduced and wherein said misalignment compensator comprises
(i) forward and aft rings which capture said bearing races therebetween, thereby preventing said bearing races and said blade gears from moving in said axial direction which provides a positive gear tip clearance between said blade gears and said ring gears and
(ii) said annular clearances which allow said bearing races and said blade gears to move in said tangential direction.

* * * * *